UNITED STATES PATENT OFFICE.

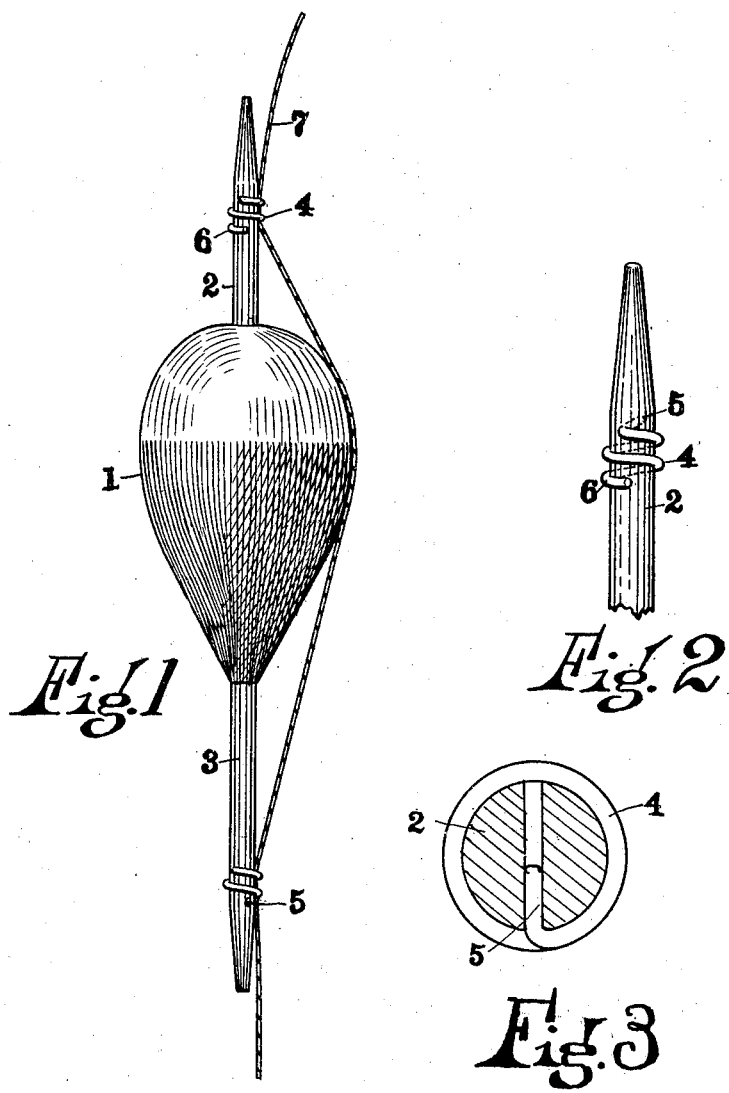

GEORGE A. PFLUEGER, OF AKRON, OHIO, ASSIGNOR TO THE ENTERPRISE MANUFACTURING COMPANY, OF AKRON, OHIO, A CORPORATION OF OHIO.

FISHING-FLOAT.

983,309.  Specification of Letters Patent.  Patented Feb. 7, 1911.

Application filed June 2, 1909. Serial No. 499,688.

*To all whom it may concern:*

Be it known that I, GEORGE A. PFLUEGER, a citizen of the United States, residing at Akron, in the county of Summit and State of Ohio, have invented new and useful Improvements in Fishing-Floats, of which the following is a specification.

This invention relates to improvements in means for attaching floats to fishing lines, so that the float can be readily used on the line without danger of being accidentally detached therefrom and at the same time the attaching means which is carried by the float is so anchored that it cannot be accidentally removed, thus preventing any danger of losing it.

Heretofore, a common construction for attaching floats to fishing lines has been to provide the stems or pins of the floats with a spirally-coiled wire wrapped about them which constitutes attaching means for the line; but as formerly constructed these coiled members have not been fixedly anchored to the float and they frequently slip off and are lost in use, thus rendering the float useless, and hence the primary object of this invention is to provide the stem or pin of the float for fishing lines with a line-attaching mechanism comprising a spirally-coiled wire wrapped about the stem or pin of the float and suitably anchored against displacement by having a portion thereof extending into or through a suitable aperture in the stem or pin.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the claims hereunto appended.

In the drawings, in which similar reference numerals indicate like parts in the different figures: Figure 1 is a view in side elevation of a float provided with my improved means for attaching the line thereto, Fig. 2 is a similar view of one of the pins of the float with my improved attaching means for the line in operative relation therewith, both the pin and attaching means being shown enlarged to better illustrate this invention and Fig. 3 is a cross-section through the pin and attaching member.

Referring to the drawings in detail, the reference numeral 1 denotes the body of the float which is preferably of the ordinary buoy-shape of fishing floats in common use, provided with an upwardly-extending pin 2 and a depending pin 3. The float 1 and pins 2 and 3 while preferably constructed of wood, may be formed of any other material such as metal, papier-mâché, vulcanized rubber, or other substance which will give equal results and the body 1 and pins 2 and 3 may be formed integral or not as desired without departing from the scope of this invention.

The invention resides in providing either or both of the pins 2 and 3 with a spirally-coiled member 4 which is wrapped one or more times about them, with one end 5 of the member extending into or through a suitable aperture provided in the pin on which the member is mounted. The free end 6 of the spiral member 4 is preferably outwardly-turned to permit a line 7 to be passed thereunder when being placed in operative relation therewith. The member 4 is preferably formed of a non-corrosive wire of sufficient inherent rigidity to be self-maintaining under service conditions and having sufficient resiliency to lightly grasp the pin on which it is mounted so as to be capable of yieldingly holding a line passed thereunder and secured thereby.

In securing a float such as has just been described to a line, the operation consists in passing the line under the outwardly-turned end 6 of each spirally-coiled member and by revolving the float the line is wound under the convolutions and coils of the member until it is firmly grasped thereby and pressed against the pin on which the member is mounted, thereby yieldingly holding the float against unintentional movement. This arrangement permits the float to be moved by hand up or down the line and it can only be detached therefrom by uncoiling the line from the spiral members 4; at the same time the ends of the spiral members being secured in the apertures in the pins are prevented from being accidentally detached therefrom and lost, which latter result constitutes a serious objection to a freely-mounted fastening device on the pin of a float and is exceedingly annoying to a fisherman using a device of this character. Furthermore, there is a decided advantage in the ability to secure the line in position by passing it within the fastening device so as to permit the convolutions thereof to frictionally hold the line against the projecting pin, this construction preventing any yielding of the device with respect to the pin when the line is being drawn taut while fishing, the placing of one end of the device in an aperture permitting the line to be run around to a point where the pulling strain will be at right angles to the direction of length of the portion of the device within the aperture, in which position, the inserted portion of the device provides an element tending to prevent a yielding of the device outwardly under such pulling strain, this being the case particularly when the inserted end is located at the outer end of the pin. Obviously, the construction herein disclosed has the effect of making the float a part of the line and having its movements in exact accordance with the movements of the line when subjected to a pulling strain.

What I claim and desire to secure by Letters Patent, is:—

1. A float for fishing lines provided with a projecting pin, the latter having an aperture, a fastening device wrapped about said pin with a portion thereof projecting into said aperture whereby said fastening device is anchored against movement, said wrapped portion being of larger diameter than the pin to permit the line to pass between it and the pin and be frictionally engaged with the latter by the wrapped portion.

2. A float for fishing lines comprising a body-portion provided with a projecting apertured pin and a line fastening device comprising a member wound spirally about said pin with a portion thereof projecting into said aperture whereby said fastening device is anchored against movement, said wrapped portion being of larger diameter than the pin to permit the line to pass between it and the pin and be frictionally engaged with the latter by the wrapped portion.

In testimony whereof I have hereunto set my hand in presence of two subscribing witnesses.

GEORGE A. PFLUEGER.

Witnesses:
C. E. HUMPHREY,
GLENARA FOX.